United States Patent [19]
Morford

[11] Patent Number: 6,047,870
[45] Date of Patent: *Apr. 11, 2000

[54] VEHICLE MOUNTED LOCKING FIREARM SUPPORT

[75] Inventor: Ted Morford, Bozeman, Mont.

[73] Assignee: Big Sky Racks, Inc., Bozeman, Mont.

[ * ] Notice: This patent is subject to a terminal disclaimer.

[21] Appl. No.: 08/963,505

[22] Filed: Nov. 3, 1997

Related U.S. Application Data

[63] Continuation of application No. 08/673,336, Jun. 28, 1996, application No. 08/312,413, Sep. 26, 1994, Pat. No. 5,531,368, application No. 08/004,982, Jan. 15, 1993, Pat. No. 5,350,094, and a division of application No. 29/000,115, Oct. 1, 1992, Pat. No. Des. 356,541.

[51] Int. Cl.[7] ........................................................ B60R 7/14
[52] U.S. Cl. ......................... 224/551; 224/311; 224/569; 224/568; 224/913; 211/64
[58] Field of Search .................................... 224/551, 402, 224/557, 568, 569, 570, 571, 913, 311, 324, 315; 211/64

[56] References Cited

U.S. PATENT DOCUMENTS

| | | | |
|---|---|---|---|
| 3,265,261 | 8/1966 | Kenrick et al. | 224/551 |
| 3,524,572 | 8/1970 | Hall | 224/551 |
| 4,747,280 | 5/1988 | Shaw | 211/64 |
| 5,116,010 | 5/1992 | McMasters et al. | 224/311 |

FOREIGN PATENT DOCUMENTS

| | | | |
|---|---|---|---|
| 6430855 | 2/1989 | Japan | 224/551 |

OTHER PUBLICATIONS

Big Sky Racks, Inc., The BSR Model Series; advertising literature, publication date unknown.
Big Sky Racks, Inc., Mounting Instructions, Models BSR-1, BSR-1L, BSR-2, BSR-2W; 5 Year Limited Warranty Publication date unknown.
Big Sky Racks, Inc.; Pricing Terms; Jan. 1, 1990.

*Primary Examiner*—Linda J. Sholl
*Attorney, Agent, or Firm*—D. L. Tschida

[57] ABSTRACT

Modular, firearm support cradles, an assembled rack and means for securing the cradles and rack to a variety of vehicle configurations. The rack includes a longitudinal frame member and from which project multiple padded cradles. Strap fasteners and lock means respectively restrain firearms and sundry paraphernalia to the cradles and rack. A telescoping expander bar assembly and mating extension arms permit a vehicle ceiling mount and/or roll bar mount of the rack. Cradles having sleeves which mate to the expander bar assembly facilitate user tailored mountings. A clamp plate assembly and mating extension arms permit a vertical divider mount of the rack.

9 Claims, 6 Drawing Sheets

VEHICLE MOUNTED LOCKING FIREARM SUPPORT

This is a Continuation of application Ser. No. 08/673,336, filed on Jun. 28, 1996; application Ser. No. 08/312,413, filed on Sep. 26, 1994, U.S. Pat. No. 5,531,368; application Ser. No. 08/004,982, filed on Jan. 15, 1993, U.S. Pat. No. 5,350,094; and a continuation-in-part of application Ser. No. 29/000,115, filed on Oct. 1, 1992, U.S. Pat. No. DES 356,541.

BACKGROUND OF THE INVENTION

The present invention relates to vehicle mounted firearm storage devices and, in particular, to a horizontal mounting storage rack and modular cradles which are mountable to a vehicle ceiling, roll bar or vertical divider, such as found in law enforcement vehicles.

Varieties of firearm storage devices have been developed over the years for storing, displaying and containing firearms such as hand guns, rifles or shotguns. Many such assemblies have been developed to contain long barrelled firearms such as shotguns and rifles to a vehicle. Most typically, these assemblies vertically contain the firearm to a law enforcement vehicles. The firearm is restrained to either the vehicle dashboard or drive train tunnel, or an accessory equipment storage rack used to contain radios and the like. Examples of such equipment racks can be found at U.S. Pat. Nos. 3,550,001; 3,727,813; and 3,964,612. A traditional vertical dashboard mount and an inclined mount to the drive train tunnel of a law enforcement vehicle are disclosed at U.S. Pat. No. 4,364,499.

Varieties of sewn fabric assemblies also exist which serve as scabbards to support a firearm to a vehicle seat or to the back compartment wall of pickup trucks. Other supports are also available from Applicant which horizontally cradle a firearm, which mount directly to the ceiling or trunk lid of a vehicle and which provide a padlocked cable retention strap.

A deficiency of many known devices is an inability to lock the firearm to the support rack. A further shortcoming is an inability to secure the support rack to accessible portions of a broad range of vehicles in a fashion which prevents loosening of the support rack over time, due to vehicle vibrations and firearm weight. Additionally, most available support racks do not accommodate mountings to vehicle roll bars or vertical security screens or shields, which divide the driver and passenger compartments of law enforcement vehicles. Nor do available supports permit the user to tailor the number and positioning of support cradles to the application.

With the foregoing deficiencies and shortcomings in mind, the present invention provides an improved support rack which accommodates wide varieties of vehicle mountings and supported appliances.

SUMMARY OF THE INVENTION

It accordingly is a primary object of the present invention to provide a vehicle mounted firearm or accessory support which horizontally contains a firearm or other paraphernalia to the vehicle.

It is a further object of the invention to provide a firearm support which includes padded cradles and one or more restraint straps.

It is a further object of the invention to provide a firearm support which includes a locking restraint which latches manually or remotely.

It is a further object of the invention to provide a firearm support which mounts to a vehicle ceiling or roll bar.

It is a further object of the invention to provide a firearm support which mounts to a walled divider that separates passenger and driver compartments of a vehicle.

It is a further object of the invention to provide a firearm support which mounts to a telescoping support that, in turn, mounts to a vehicle ceiling.

It is a still further object to provide a support assembly wherein the cradles may be selectively arranged along the telescoping support.

Various of the foregoing objects, advantages and distinctions of the invention are obtained in one presently preferred construction which provides a framework that includes a longitudinal frame member and a pair of transverse, fixed position foam padded cradles which receive and support a long barrelled firearm. Strap fasteners are trained about each cradle to retain the firearm thereto.

A remote and/or manually actuated lock assembly mounts between the cradles to lock the firearm to the rack. The frame accommodates alternative extension pieces which are adaptable to mountings with a vertical security screen or compartment divider, with a telescoping mounting assembly which spans between side framing members and with a vehicle roll bar.

In an alternative construction, padded cradles are provided which include sleeves that mate to the telescoping support. The number, spacing and type of support cradles can be tailored to the vehicle and user.

Still other objects, advantages and distinctions of the invention are described in greater detail below. To the extent various modifications and improvements have been considered, they are described as appropriate. The invention should not be interpreted in strict limitation to the following description, but rather should be interpreted within the scope of the further appended claims.

DESCRIPTION OF THE PREFERRED EMBODIMENT

Figure 1:
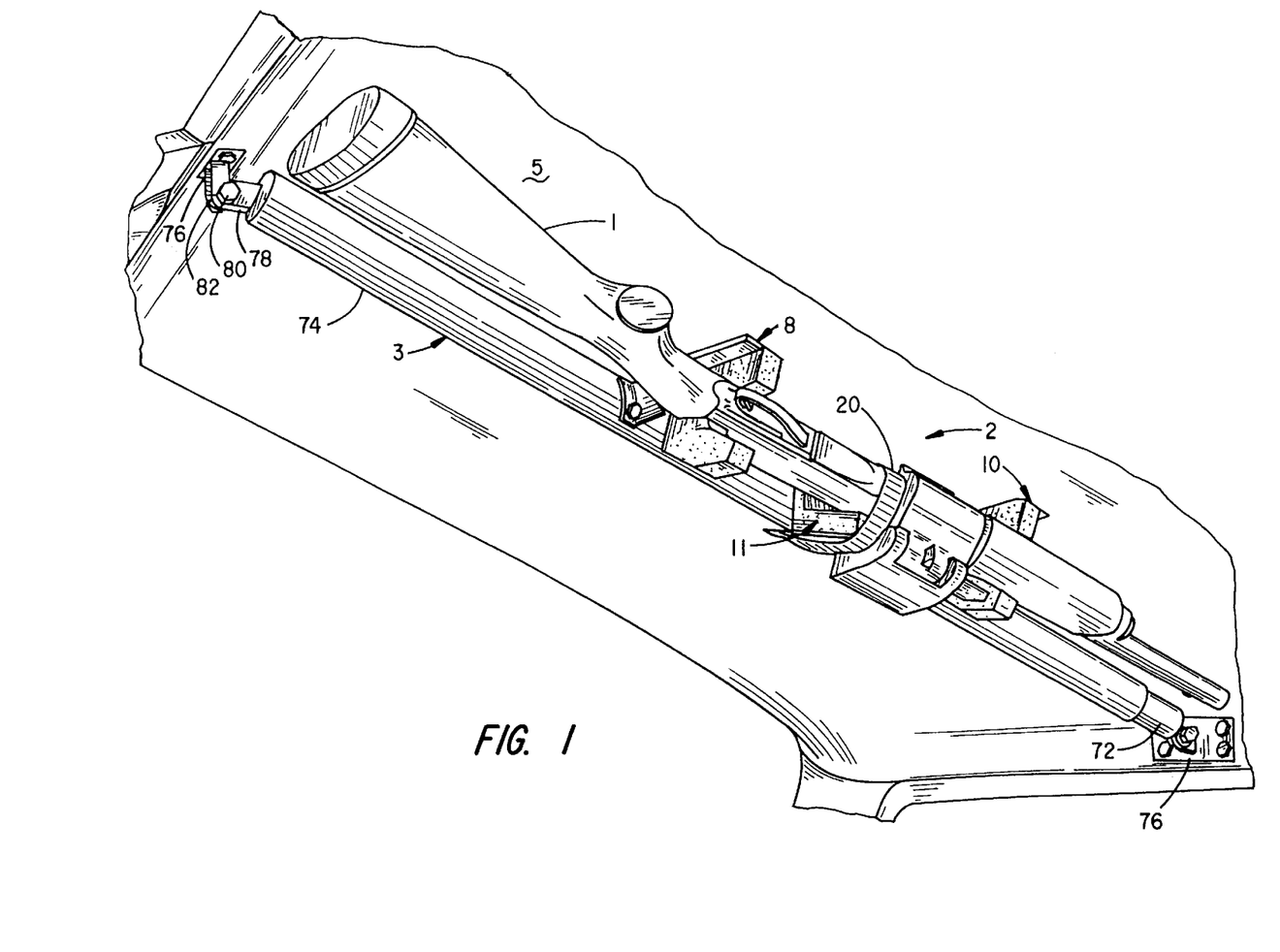
FIG. 1 iS a perspective drawing showing a ceiling mounted, locking firearm support of the invention having fixed position cradles.
Figure 2:
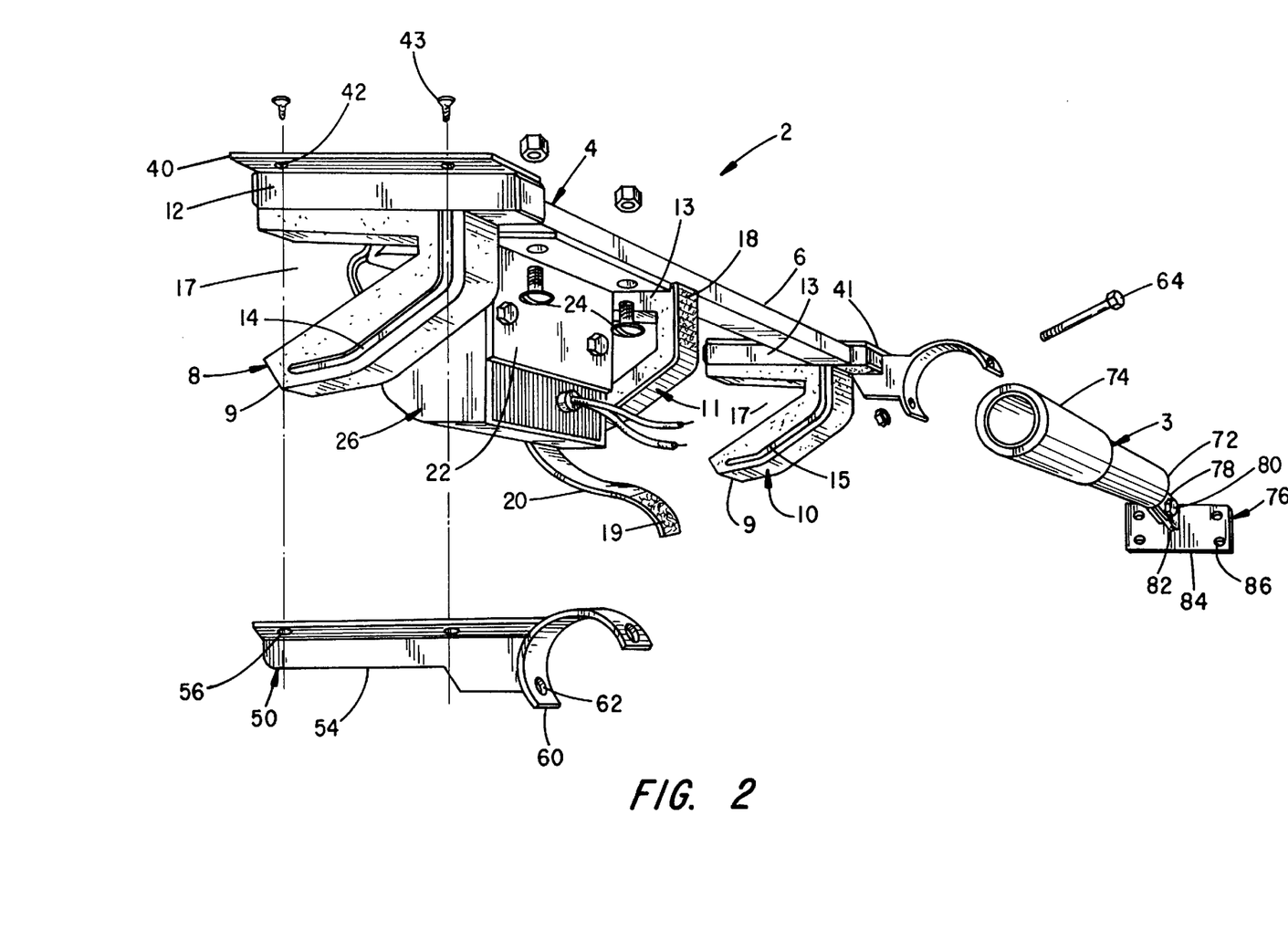
FIG. 2 is a perspective drawing shown in exploded assembly of the firearm support of FIG. 1.

Referring to FIGS. 1 and 2, isometric views are shown of a firearm 1 which is contained to a firearm support rack 2. The rack is secured to an expander bar or telescoping vehicle support assembly 3 and which support rack 2 and assembly 3 are secured to a vehicle frame, i.e. the ceiling 5.

The support rack 2 comprises a framework 4 which is constructed of a number of frame members and which are formed of tubular metal. The frame 4 provides a fixed length longitudinal frame member 6 that is mounted parallel to the vehicle support 3 and to the left and right ends of which are attached identical firearm cradles 8, 10 and 11. Each cradle 8, 10 includes an arm 12, 13 which is formed from a length of square tube stock. Each arm 12, 13 extends from one of the ends of the longitudinal member 6. Depending from each cradle 8, 10 is an angular support arm 14, 15 which is formed of a metal flat stock and which is welded at one end to the transverse arms 12, 13. Inner and outer surfaces of the arms 14, 15 are covered with a high density foam material 9 that is adhesively bonded to the arms 14, 15. When viewed in side elevation, each of the cradles 8 and 10 provides a shaped recess or cavity 17 which receives and supports a portion of the supported firearm 1. Depending upon the type of firearm, one of the cradles may support the firearm receiver or stock, while the other supports the barrel and/or forearm of the firearm such as in the case of the shotgun depicted. The rack 2 finds particular advantage with long barrelled weapons or other accessories of relatively long length versus handguns. The shape of the cradle cavity 17 can be varied to the supported firearm or other contained appliance.

Separately mounted to the frame member 6, intermediate the cradles 8 and 10, is a third cradle 11. The cradle 11 is substantially similar to the cradles 8, 10 and provides a foam covered metal core. A strap restraint 20 is secured to encircle the cradle 11. The strap 20 is constructed from a woven nylon web and mating portions 18, 19 of a VELCRO type of fastener material are secured to mating ends of the strap 20. The strap 20 permits the cinching of the firearm to the rack 2 to prevent undesired release, except possibly during an accident when the strap 20 may release with a surging of the firearm 1 against the strap 20. Additional straps 20 can be mounted to the cradles 8 and 10 as desired.

Mounted adjacent to the cradle 11 is a lock assembly 26. The lock assembly 26 is secured to the frame 4 via a bracket plate 22 which is fastened to the frame member 6 with suitable bolts/nut fasteners 24. The lock assembly 26 finds particular advantage in law enforcement vehicles where a firearm is a permanent fixture of the vehicle, and where it is necessary to restrain the firearm securely and unobtrusively to the vehicle to prevent undesired access from unauthorized occupants or passersby.

Figure 3:
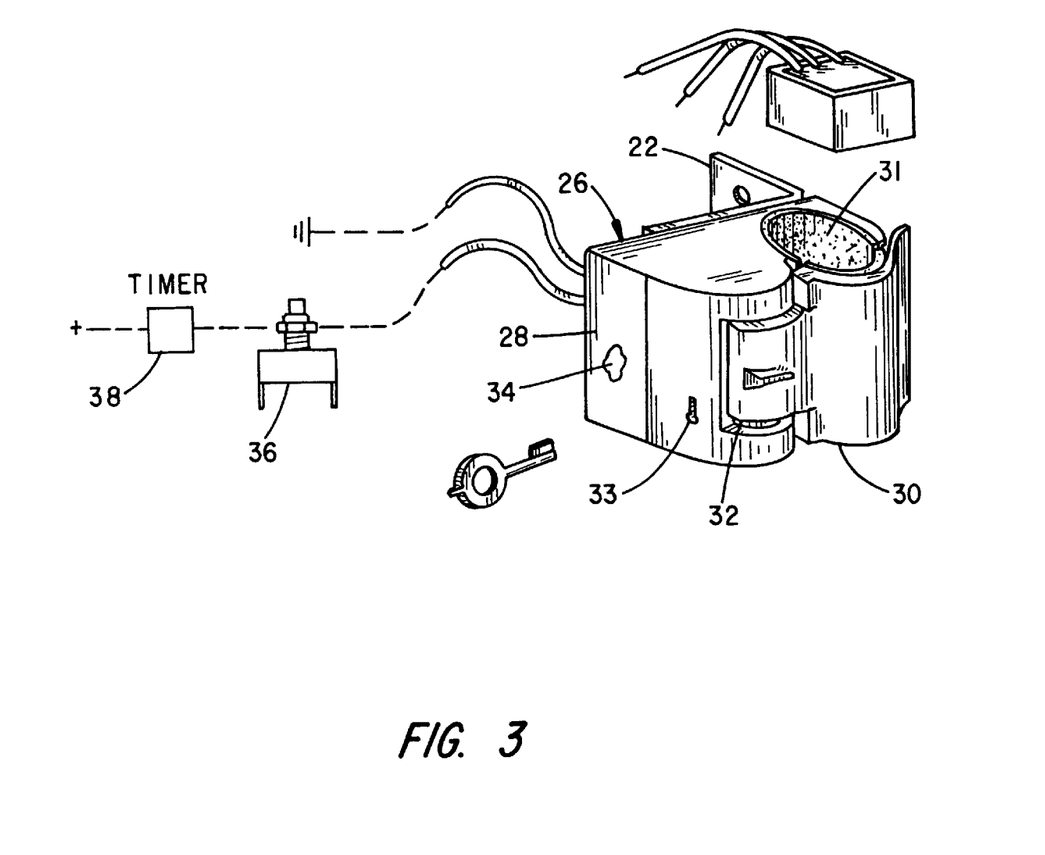
FIG. 3 is a perspective drawing of the manual or remotely actuated firearm latch assembly.

Referring to FIG. 3, the lock assembly 26 includes a cast metal body 28 and to which a clamp arm 30 is pivotally secured via a hinge pin 32 to define a clamp space 31. The clamp arm 30 and an internal keyed lock assembly 33 cooperate to permit a locking of the arm 30 about the firearm 1 and retention of the firearm 1 within the clamp space 31. The firearm 1 may thus be locked to the rack 2 and vehicle to prevent undesired release, even in case of an accident or severe road conditions.

Also included with the lock assembly 26 is a wound coil, solenoid actuator 34 (shown at the cutaway portion of FIG. 3) which cooperates with the lock 33 to permit remote operation of the lock, such as from a dash mounted push button 36. A delay timer 38 may also be wired to the power supply circuit of the solenoid 34 to provide a timed delay between actuation of the push button 36.

In a ceiling mount construction, the rack 2 is secured to the vehicle via a pair of plates 40, 41 that are fastened to the tops of the arms 12, 13. A number of holes 42 are let into the plates 40, 41 to receive fasteners 43 which secure the plates 40, 41 to the rack 2 and to adjoining portions of the vehicle framing or rack. That is, others of the holes 42 can align with various extension arms 50 and 52, reference FIGS. 2 and 4, which enable additional attachment points of the rack 2 to the vehicle.

The extension arm 50 particularly provides a right angled member 54 having a number of apertures 56 which are positioned to mate with selected ones of the fasteners 43. An arcuate collar 60 is secured to an end of the member 54. The curvature of the collar 60 is shaped and sized to mate with either a roll bar, such as found in many types of law enforcement vehicles, or the telescoping expander bar assembly 3 of FIG. 1. Presently, the collar is sized to mount to a roll bar or expander bar 3 having a nominal inside diameter approximately 1⅝ inches; although the size may be varied as necessary.

The collar 60 is secured to the roll bar or expander bar assembly 3 upon drilling holes which align with the holes 62 of the collar 60 and securing bolt/nut fasteners 64 therebetween. The rack 2 may thus be restrained not only to the vehicle at the ceiling plates 40, but also to a separately provided roll bar or expander bar assembly 3. For a conventional roll bar mounting, the roll bar is typically welded to the vehicle chassi and the collars 60 are merely bolted to the curved roll bar, which roll bar may also be padded. Normal road vibration and other vehicle movements are thereby distributed over a number of fastening points.

A typical expander bar mounting is shown at FIG. 2 and also at FIG. 1. The expander bar assembly 3 comprises a pair of tubular extension pieces 72 and 74 which slide mount inside each other and are length adjustable to span the interior width of most pickup trucks and automobiles. The extension pieces 72, 74 may be formed from suitably sized round or square tube stock. Mounted to each end of the bars 72, 74 are separate vehicle retainers 76.

Each retainer 76 includes a pivot arm 78 which is welded to an end of one of the arms 72, 74. A pivot fastener 80 extends through apertures formed in the pivot arm 78 and a mating yoke arm 82 that projects from a mounting plate 84. A number of holes 86 are provided in each plate 84 to mount the plate 84 to interior of the vehicle. Upon appropriately pivoting the retainer 76, the expander bar assembly may be restrained to the ceiling 5 or vehicle sidewalls, such as above the windows or doors.

Figure 4:
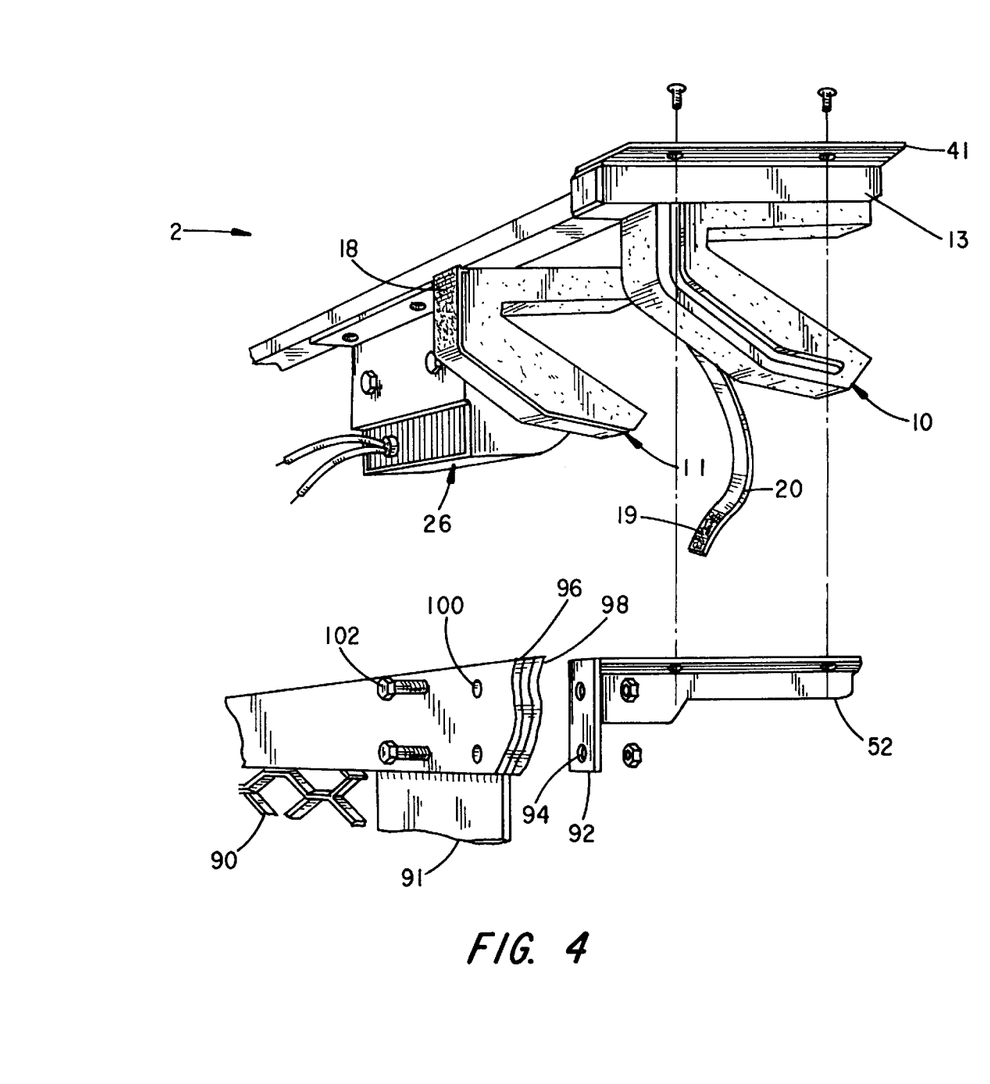
FIG. 4 is a perspective drawing of a vertical divider mounted firearm support showing alternative window and screen mountings.

With additional attention to FIG. 4, a perspective view is shown in exploded assembly of alternative mountings of the rack assembly 2 via the extension arm 52 to typical screen or window divider assemblies 90 and 91, such as are used to divide the passenger and driver compartments of a law enforcement vehicle. Only portions of each of the alternative assemblies 90 and 91 are shown; normally, only one or the other is provided.

Instead of including an arcuate collar 60, each arm 52 provides a transverse, flat end plate 92 which includes a number of apertures 94. A pair of flat clamp plates 96 and 98 mount to opposite sides of the screen assembly 90 or shield assembly 91. Each clamp plate includes holes 100 which align with the holes 94 and receive fasteners 102. The rack assembly 2 may thus be restrained to either a screen or window divider. The rack 2, in turn, is secured to the brackets 52 at the plates 40, 41. Preferably and as with the extension arms 50, the rack 2 is also secured to the vehicle ceiling.

In combination, the modular configuration of the firearm support rack 2 taken with the extension arms 50, 52, expander bar assembly 3 and clamp plates 96, 98 accommodate essentially all types of law enforcement vehicles. An unobtrusive firearm mount within the head space of the vehicle is obtained and the firearm is not readily visible to passersby. Potential theft is thereby reduced. The firearm is also safely removed from the vehicle occupant.

Figure 5:
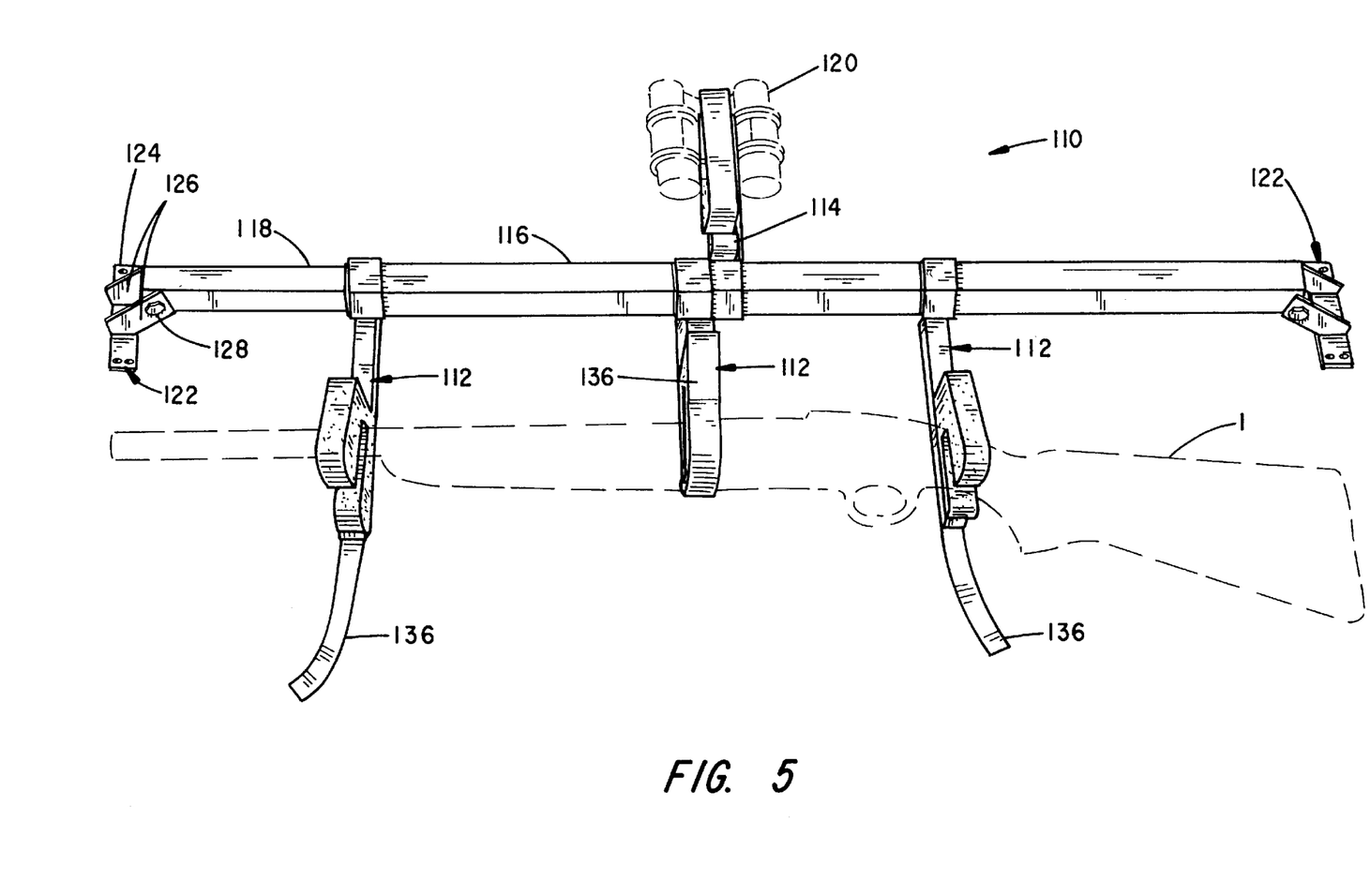
FIG. 5 is a perspective drawing of a modular support assembly wherein sleeve segments of each cradles mount along a telescoping support.

Referring to FIG. 5, yet another modular firearm or accessory support 110 is shown which allows the user to tailor the type and arrangement of a plurality of cradles 112 and 114 to the telescoping extension bars or pieces 116, 118. The depicted cradles particularly support a firearm 1 and a pair of binoculars 120, which are shown in phantom line. The extension bars of the assembly 110 utilize rectangular or square tube stock in lieu of round stock as for the expander bar assembly 3. Pivoting retainer bracket assemblies 122 are mounted to each of the exposed ends of the extension bars 116, 118.

Each retainer bracket includes a multi-apertured mounting plate 124 and from which a pair of bored yoke arms 126 project. A fastener 128 extends through aligned holes at each arm 126 and an end of one of the bars 116, 118 to pivotally restrain each retainer assembly 122 to the respective bar 116, 118. As before the retainers 112 are appropriately pivoted to mate with the vehicle as the bars 116, 118 extend or retract to accommodate the necessary mounting spacing.

Figure 6:
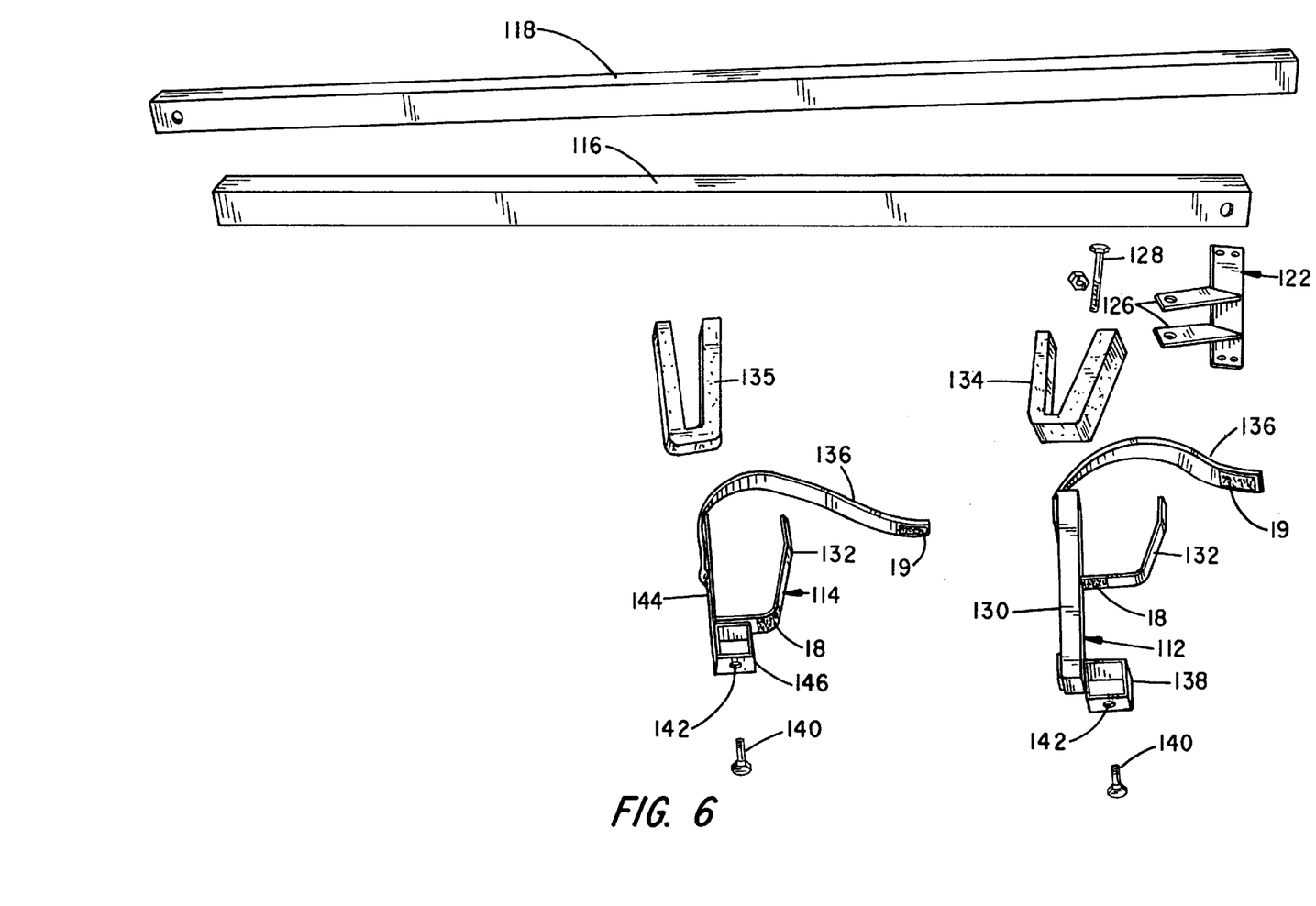
FIG. 6 is an exploded assembly drawing of various of the modular components of the assembly of FIG. 5.

More of the details of the construction of the component assembly of the support 110 can be seen at FIG. 6. Especially apparent at FIG. 6 is the construction of the support cradles 112 and 114. With attention first to the cradle assembly 112, the assembly includes a tubular extension piece 130 and to which a flat stock arm 132 is welded approximately mid-length of the arm 130. An elastomer or foam liner 134 is shaped to mount about the arm 132. A nylon strap 136 extends from the outermost end of the arm 130. Secured to the strap 136 and arm 132 are mating VELCRO fastener portions 18, 19. Welded along the length of the arm 130 is a sleeve 138 which is sized to mount over the bar 116. The sleeve allows the selective positioning of the cradle 112 along the bar 116. Once positioned, a set screw 140 which mounts to a threaded aperture 142 fixes the cradle 112 to the support 110.

In contrast to the cradle 112, the cradle assembly 114 provides a flat-stock extension piece 144 and to which a cradle arm 132 and strap 136 are attached. A foam liner 135 which is shaped to receive the binoculars 120 is contained by the arm 132. The shape of the liner 135 may be varied as desired to accommodate the supported accessory. A sleeve segment 146 is also secured to the extension piece 144, but against the arm 132. A threaded aperture 142 and set screw 140 permit a selective mounting of the cradle along the bar 116.

Depending upon the ceiling space of a vehicle, one or more of each of the cradles 112 and 114 may be arranged along the length of the expander bars 116, 118 to selectively receive one or more firearms or accessory paraphernalia such as binoculars, flashlights, bow and arrows, etc. Depending upon the positioning of the arms 132 along the extension pieces 130 and 144, the lateral spacing of the supported equipment can be varied with respect to the expansion bars 116, 118. Thus, multiple firearms 1 may be mounted in side-by-side relation to one another along one side of the assembly 110, while other accessory equipment may project from the opposite side. Alternatively, separate firearms 1 may be supported to either side of the bars 116, 118 with appropriate selection of the cradles 112 or 114.

While the invention has been described with respect to its presently preferred constructions, it is to be appreciated still other constructions may be suggested to those skilled in the art. Accordingly, the following claims should be interpreted to include all those equivalent embodiments within the spirit and scope thereof.

What is claimed is:

1. Firearm support apparatus for securing a firearm inside the passenger compartment of a motor vehicle comprising:
   (a) a vehicle support including first and second members mounted to extend and retract in relation to one another and further including attachment means for securing an end of each of the first and second members to the motor vehicle; and
   b) a cradle support rigidly mounted to said vehicle support and including i) a longitudinal member mounted to extend parallel to the vehicle support, ii) an arm rigidly mounted to said longitudinal member to extend transverse to said longitudinal member, iii) a cradle having a firearm support recess secured to a distal end of said arm, iv) lock means mounted to said longitudinal member and displaced laterally of said cradle for containing a portion of the firearm in a clamp space, and v) wherein said firearm support recess and said clamp space are oriented to support the firearm to extend parallel to said vehicle support.

2. Apparatus as set forth in claim 1 wherein said lock means includes a body and a retainer arm mounted to said body at a pivot and wherein said retainer arm pivots to encircle said firearm in the clamp space and latch to said body.

3. Apparatus as set forth in claim 2 including means for remotely releasing said retainer arm from latched engagement to said body.

4. Apparatus as set forth in claim 1 wherein said attachment means includes means for varying the separation of said vehicle support from a mounting surface of the passenger compartment.

5. Apparatus as set forth in claim 1 wherein at least one of said first and second members is tubular and the other of said first and second members is mounted to telescope within the other.

6. Firearm support apparatus for securing a firearm inside the passenger compartment of a motor vehicle comprising:
   (a) a vehicle support including first and second members mounted to telescope from one another and further including a plurality of mounting brackets to secure an end of each of the first and second members to the motor vehicle;
   (b) a cradle support rigidly mounted to said vehicle support and including i) a longitudinal member mounted to extend parallel to the vehicle support, ii) a cradle rigidly mounted to said longitudinal member and having a firearm support recess exposed transverse to said longitudinal member, iii) a plate secured to said longitudinal member and displaced laterally of said cradle, iv) lock means secured to said plate for containing a portion of the firearm in a clamp space, and v) wherein said firearm support recess and said clamp space are oriented to displace and contain the firearm to extend parallel to said vehicle support.

7. Firearm support apparatus for securing a firearm in the passenger compartment of a motor vehicle comprising:
   (a) a vehicle support including first and second members mounted to extend and retract in relation to one another and further including attachment means for securing an end of each of the first and second members to the motor vehicle; and
   b) a cradle support rigidly mounted to said vehicle support and including i) a longitudinal member mounted to extend parallel to the vehicle support, ii) first and second cradles rigidly mounted to first and second arms that extend transverse from said longitudinal member and wherein said first and second cradles each have a firearm support recess, iii) lock means secured to said longitudinal member for containing a portion of the firearm in a clamp space, and iv) wherein said firearm support recess and said lock means are oriented to support the firearm to extend parallel to said vehicle support.

8. Apparatus as set forth in claim 1 wherein one of said first and second cradles comprises a lock having a body and a retainer arm, wherein the retainer arm is mounted to said body at a pivot and wherein said retainer arm pivots to encircle a firearm in the clamp space and latch to said body.

9. Firearm support apparatus for securing a firearm in the passenger compartment of a motor vehicle comprising:

(a) a vehicle support including first and second members mounted to extend and retract in coaxial relation to one another and further including a plurality of brackets to secure an end of each of the first and second members to a motor vehicle to substantially span a ceiling of the passenger compartment; and b) a cradle support rigidly mounted to said vehicle support and including i) a longitudinal member mounted to extend parallel to the vehicle support, ii) first and second cradles rigidly mounted to said longitudinal member and each having a firearm support recess exposed transverse to said longitudinal member, iii) a lock comprising a body and a retainer arm, wherein the retainer arm is mounted to said body at a pivot and wherein said retainer arm pivots to encircle a firearm in a clamp space and latch to said body, and iv) wherein said firearm support recess and said clamp space are oriented to support the firearm to extend parallel to said vehicle support adjacent the ceiling of the passenger compartment.

* * * * *

UNITED STATES PATENT AND TRADEMARK OFFICE
CERTIFICATE OF CORRECTION

PATENT NO.      : 6,047,870                                       Page 1 of 1
DATED           : April 11, 2000
INVENTOR(S)     : Ted Morford It is certified that error appears in the above-identified patent and that said Letters Patent is hereby corrected as shown below:

<u>Column 7,</u>
Line 9, "1" should read -- 7 --.

Signed and Sealed this

Ninth Day of September, 2003

JAMES E. ROGAN
*Director of the United States Patent and Trademark Office*